Sept. 14, 1948.  C. SCHEUER  2,449,512
APPARATUS FOR MAKING HOLLOW PLASTIC ARTICLES
Filed March 24, 1947
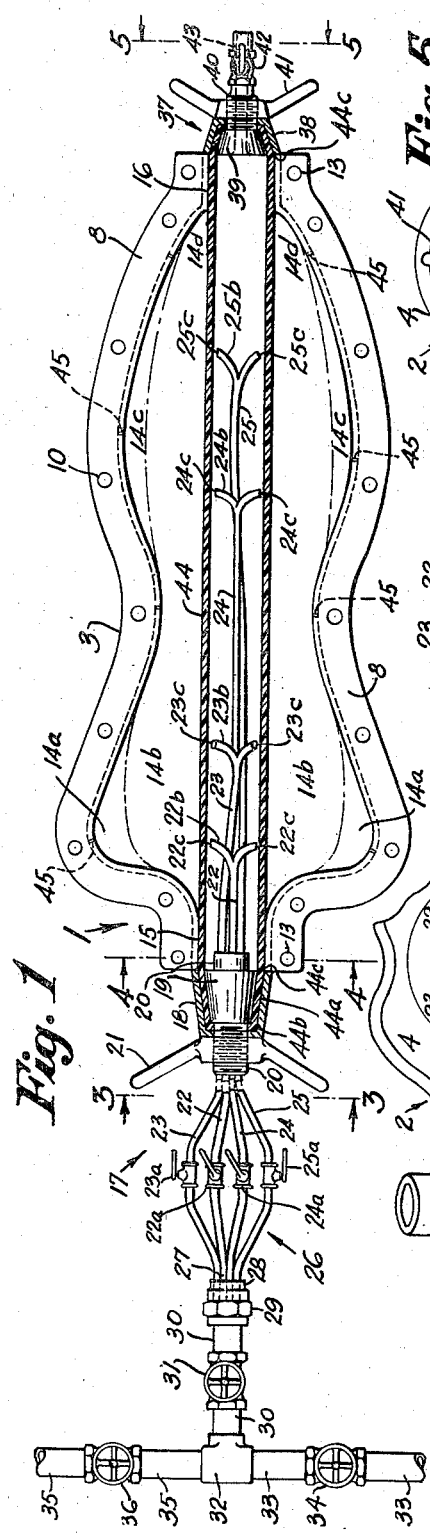
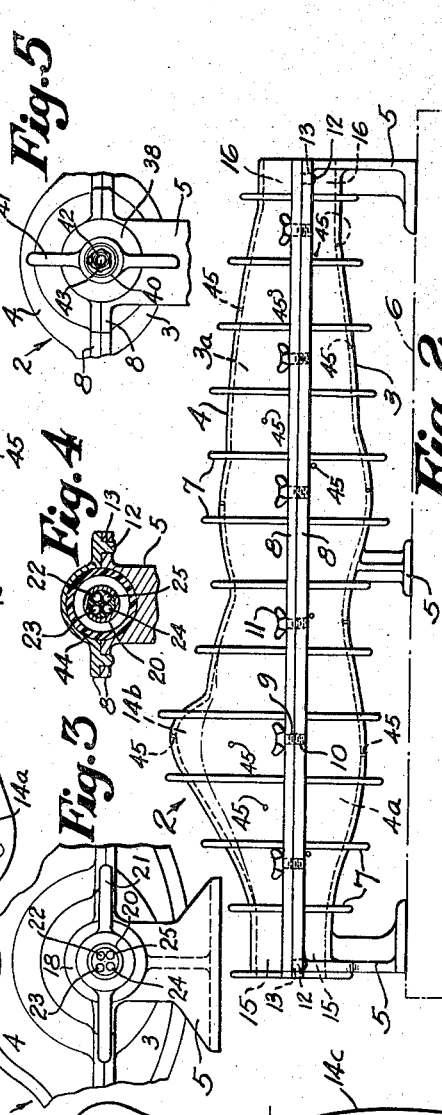
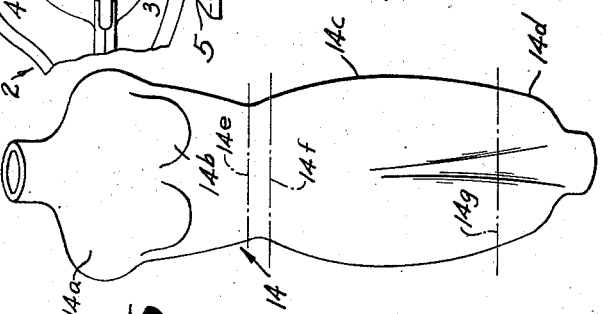
INVENTOR.
Clemens Scheuer.
BY
Benjamin Roman.
Atty.

Patented Sept. 14, 1948

2,449,512

UNITED STATES PATENT OFFICE 2,449,512

APPARATUS FOR MAKING HOLLOW PLASTIC ARTICLES

Clemens Scheuer, Forest Hills, N. Y.

Application March 24, 1947, Serial No. 736,753

3 Claims. (Cl. 18—19)

This invention relates to an apparatus for therewith producing hollow articles consisting of plastic material, and particularly for manufacturing of such material human forms as used in stores in connection with displaying wearable merchandise.

The principal object of the invention is to provide an apparatus for the aforesaid purpose, wherewith said forms may be made with ease, convenience, relative rapidity, without requiring undue skill, and which forms will be strong, efficient, perfect, and saleable at low cost.

Other objects and advantages will hereinafter appear.

In the accompanying drawings—

Fig. 1 is a plan view of the apparatus of the invention, and showing parts thereof in cross-section and the upper member of its mold removed, for convenience of illustration.

Fig. 2 is an elevational view of the mold forming a part of the apparatus shown in Fig. 1.

Fig. 3 is an elevational end view showing a portion of the apparatus, as seen at arrows 3—3 in Fig. 1.

Fig. 4 is a cross-sectional elevational view, taken on line 4—4 of Fig. 1.

Fig. 5 is an elevational end view showing a portion of the apparatus, as seen at arrows 5—5 in Fig. 1.

Fig. 6 is a perspective view illustrative of the type of human form which is produced by the method and apparatus of the invention.

Figs. 7 and 8 are an elevational and end view respectively of a plastic tube, from which material the form illustrated in Fig. 6 is made by the invention.

The apparatus 1, Fig. 1, includes a mold 2, Fig. 2, comprising a lower half member 3 and upper half member 4, the former having legs 5 for supporting the mold upon any desired table or base 6. Both members 3, 4 are provided with series of cooling fins 7, cooperating flanges 8 with registering holes 9 and taps 10, and winged bolts 11 which pass through said holes and taps for firmly securing the members to each other. The member 4 is also preferably provided with a series of projecting pins 12 that are insertible into registering holes 13 in member 3, for conveniently aligning the members prior to securing them with the bolts 11. The mold members 3, 4 are made of any suitable metal having cavities 3a, 4a corresponding to the human form 14, Fig. 6, to be fabricated, and are provided with open necks 15, 16 at their ends, Fig. 1.

The apparatus 1 includes a device 17, Fig. 1, having a cap 18 which is registrable with and closable of the neck 15 of mold 2. Located within the cap 18 is a block 19 forming part of a shank 20 over which is threadable as shown a winged nut 21, and secured to and passing through said shank is a cluster of pipes 22, 23, 24, 25, as shown in Figs. 1, 3, 4. Leftwardly from the shank 20, as seen in Fig. 1, the said pipes branch out into a nest 26 in which they are provided with individual valves 22a, 23a, 24a, 25a, and from said nest they converge again into a cluster 27 secured to and passing through a fitting 28 connectable by a union 29 to a pipe line 30. Said line is provided with a valve 31 and connected by a T 32 to a steam line 33 having a valve 34 and a compressed air line 35 having a valve 36. When the device 17 is in the condition illustrated in Fig. 1, relatively to the mold 2, its pipes 22, 23, 24, 25 project rightwardly from the shank 20 into the mold as shown, the pipe 22 terminating in spouts 22b having openings 22c situated in the region and direction of the shoulders 14a of form 14 of the mold cavities. Similarly, the pipe 23 terminates in spouts 23b with openings 23c in the region and toward the direction of the breasts 14b of form 14, the pipe 24 has terminating spouts 24b with openings 24c in the region and direction of the hips 14c of said form, and the pipe 25 has spouts 25b terminating in openings 25c in the region and direction of the legs 14d of the form.

The apparatus 1 includes a device 37, Figs. 1–5, having a cap 38 which is registrable with and closable of the neck 16 of mold 2. Located within the cap 38 is a block 39 forming part of a shank 40 over which is threadable as shown a winged nut 41, and said shank carries a valve 42 for closing and opening a clear through outlet bore 43 of the shank and the block 39.

The human form 14, Fig. 6, as made by the apparatus of this invention, is of plastic material known commercially as "Lucite" and technically designated methyl methacrylate, and is initially in the form of a tubing 44, Figs. 7, 8 of predetermined length. Preparatory to the actual blowing process with the apparatus 1, several of its parts together with the tubing 44 are assembled as follows: Firstly, the tubing 44 is preheated so as to soften its material. Then, the entire device 17, in condition separated from the mold 2 and the union 29, is joined to the tubing 44 in the relation illustrated in Fig. 1, i. e., the pipes 22—25 with their spouts 22b—25b are inserted within the tubing and the block 19 is located within the end portion thereof. Thereupon, the softened end portion of tubing 44 is formed taperingly over the frusto-conical block 19 as shown in Fig. 1 as a frustum 44a with a rim 44b, the cap 18 and nut 21 having previously been slid away backwardly to permit this work. The cap 18 is then slid forwardly over said frustum and rim and the nut 21 is threaded tightly against the cap, in which manner the entire device 17 is firmly secured to the tubing 44. By precisely similar means the entire device 37 is likewise joined to the opposite end of the tubing 44, as illustrated in Fig. 1. The devices 17, 37 with the tubing 44 having been thus assembled as a unit, the latter is placed in the lower member 3 of the mold 2, with the end portions of the tubing 44 resting in the half-necks 15, 16 thereof. The fitting 28 is then connected to the line 30 by the union 29, the upper mold member 4 is placed upon the lower member 3, all of the bolts 11 are then tightened, and the entire apparatus 1, with its valves 23a—25a set in closed state, is thus rendered ready for the blowing process. Just previous to insertion of the assembled unit into the mold 2, the tubing 44 thereof is reheated to condition it for the blowing.

For carrying out this blowing process, the line 30 furnishes a steady supply of steam at 75 lbs. pressure, the line 35 supplies compressed air at 75 lbs., while the valve 31 of connecting line 30 may be set to feed said fluids at varying pressures to the apparatus 1. For commencing the blowing, the valves 31, 36 and the valves 22a—25a are initially closed, and then the valve 31 is opened to feed the steam at a pressure of 35 lbs. Thereupon, the valve 23a is opened, and the steam emanating from the outlets 23c initially expands the tubing 44 in the breast region 14b of the mold cavity to approximately the dash and dot line in Fig. 2. The valves 22a, 24a, 25a are then opened consecutively at and for one-half minute intervals and duration, which similarly expands initially the tubing 44 in the regions 14a, 14c, 14d to the dash and dot lines in Fig. 1 respectively. The operating valve 31 is thereupon opened up to feed the full 75 lbs. steam pressure for a duration of two minutes, which continues and completes the said expansions of the tubing material for efficiently and tightly filling the entire mold. Throughout the said expansions of the plastic material the air of the mold cavity escapes through vents 45 thereof. The steam valve 34 is then closed and the air valve 36 opened to admit the compressed air through the valves 31, 22a—25a, and outlets 22c—25c into the mold, the valve 42 of device 37 being thereupon opened to permit ejection of the steam from the mold and its replacement by the air and then closed, and the air at 75 lbs. pressure then remains in the mold for 10 minutes to effectively set and cool the molded figure 14. The air valve 36 is then closed and the outlet valve 42 opened, to release the compressed air from the mold, which may be then opened up. The plastic figure may be then removed from the mold 2 together with its assembled devices 17, 37, and trimmed away from the latter at annular places 44c, thereby leaving the completely produced human figure 14 illustrated in Fig. 6.

It will be evident that but portions of the figure 14, as down only to its level 14e, Fig. 6, or that between its levels 14f, 14g, may be fabricated by a proportionately constructed mold 2, devices 37, 17, and the hereinabove described method and process.

Variations may be resorted to within the scope of the invention, and portions of the improvements may be used without others.

Having thus described my invention, I claim:

1. An apparatus for therewith making a hollow plastic article having the combination of a mold for the article adapted to receive therewithin a tube of plastic material and having an opening for the end of said tube, a device adapted to seal said opening and engage said tube end, a plurality of pipes each passing through said device for extending interiorly in said tube, said pipes extending exteriorly of said mold, each of said exterior pipes having a valve, a compressed fluid line being connected to said pipes, and said pipes having outlets that are located in the regions and directions of the deep parts of said mold.

2. An apparatus for therewith making a hollow plastic article having the combination of a mold for the article adapted to receive therewithin a tube of plastic material and having an opening for the end of said tube, a device adapted to seal said opening and engage said tube end, a plurality of pipes extending from said device interiorly in said tube, said pipes extending from said device exteriorly of siad mold, each of said exterior pipes having a valve, a compressed fluid line being connected to said pipes, said pipes having outlets that are located in the regions and directions of the deep parts of said mold, said mold having a secondary opening for the opposite end of said tube, a secondary device adapted to seal said secondary opening and engage said opposite end of the tube, said secondary device having a bore leading into said tube and exteriorly of said mold and tube, and a valve for opening and closing said bore.

3. An apparatus for therewith making a hollow plastic article having the combination of a mold for the article adapted to receive therewithin a tube of plastic material and having an opening for the end of said tube, a device adapted to seal said opening and engage said tube end, a plurality of pipes extending from said device interiorly in said tube, said pipes extending from said device exteriorly of said mold, each of said exterior pipes having a valve, a compressed fluid line being connected to said pipes, said pipes having outlets that are located in the regions and directions of the deep parts of said mold, means to feed compressed air through said line, valves, and pipes into said mold, said mold having a secondary opening for the opposite end of said tube, a secondary device adapted to seal said secondary opening and engage said opposite end of the tube, said secondary device having a bore leading into said tube and exteriorly of said mold and tube, and a valve for opening and closing said bore.

CLEMENS SCHEUER.

REFERENCES CITED

The following references are of record in the file of this patent:

UNITED STATES PATENTS

| Number | Name | Date |
|---|---|---|
| 2,003,707 | De Witt | June 4, 1935 |
| 2,401,299 | Glavin | June 4, 1946 |

FOREIGN PATENTS

| Number | Country | Date |
|---|---|---|
| 15,868 | Great Britain | Oct. 7, 1890 |